Patented Oct. 2, 1945

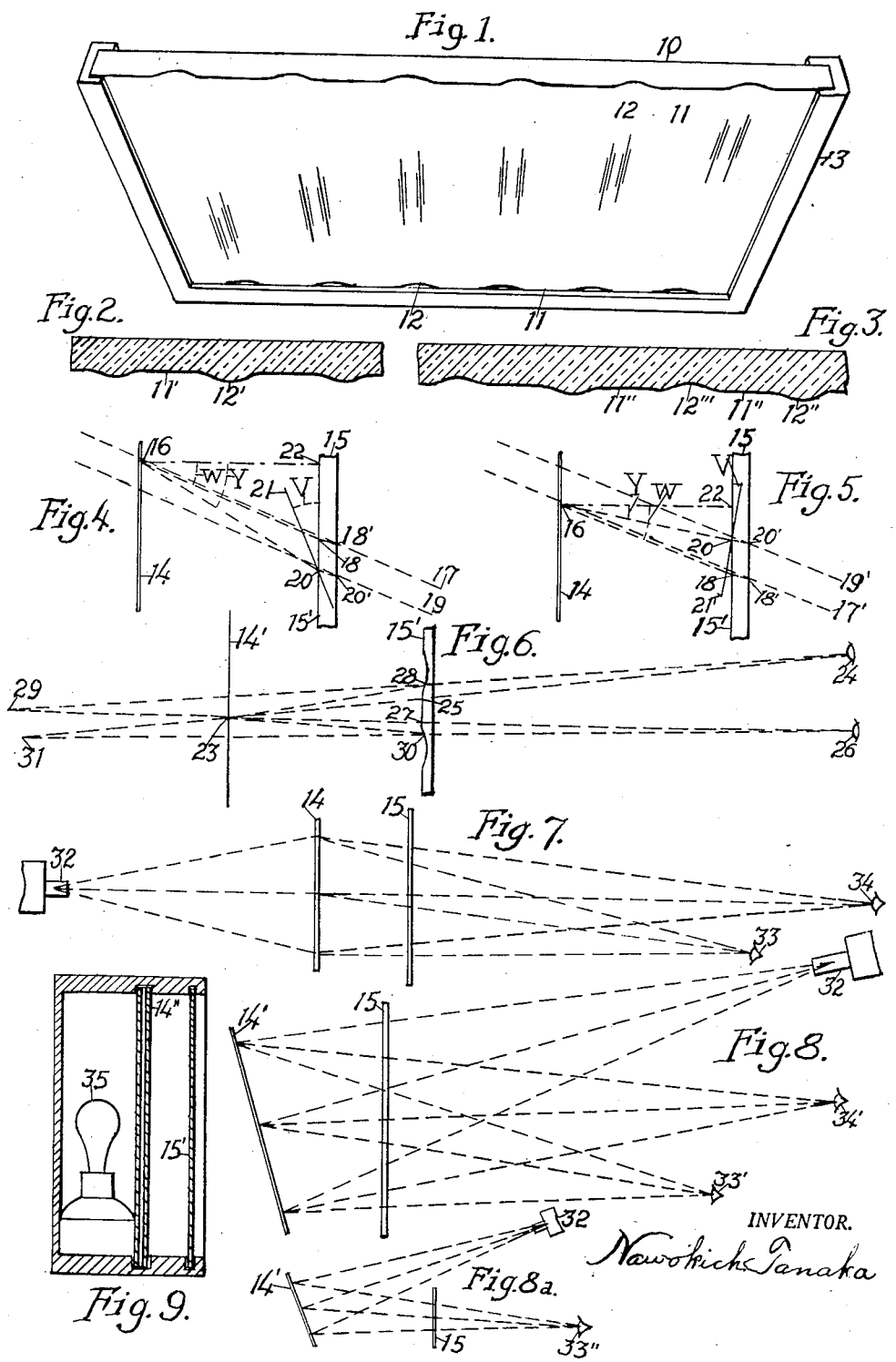

2,386,075

UNITED STATES PATENT OFFICE 2,386,075

REFRACTION MEANS FOR PRESENTING PICTURES

Nawokich Tanaka, New York, N. Y.

Application November 9, 1943, Serial No. 509,552

10 Claims. (Cl. 88—28.93)

This invention relates to refraction means for presenting pictures in apparent three dimensions, whereby photographic and certain other perspective pictures, projected or printed on picture carriers, may be shown with relief effect.

The invention resides on the following discoveries: When rays of light from each small part of a picture are refracted toward the eyes of a viewer in such manner that the intersections of visual lines therefrom will occur without special conscious effort on the part of the viewer at two or more points on planes at different distances from the eyes, said picture as a whole will appear with apparent depth. However, for securing satisfactory result with prominent manifestation of the third dimension the refractor should comprise strip parts of substantially even thickness and varying thickness, the widths thereof being limited in relation to the interpupillary distance.

The generic object of this invention is to provide means by which two dimensional visible representations of three dimensional objects may be presented with the apparent third dimension.

The main object is to provide means whereby projected still or motion pictures may be shown in apparent three dimensions to the naked eyes, with a slight sacrifice of illumination, employing customary picture films.

Another object is to provide means by which photographs, prints thereof, in full or half tone, or certain paintings may be shown or displayed with a three dimensional effect.

A further object is the employment of a refractor which has its refractive surface striped with alternate plane and curved areas, the widths thereof being dimensionally related to and limited by the interpupillary distance.

With the above and other objects in view, my invention comprises certain details of construction and arrangement of parts as will be hereinafter more fully described, illustrated and claimed, the reference being taken in the accompanying drawing which forms a part of this specification.

In the drawing,

Fig. 1 illustrates a perspective view of a refractor with the top open, embodying the invention;

Figs. 2 and 3 show modifications of my refractors in fragmental sections;

Figs. 4 and 5 are diagrams for trigonometrically determining suitable contour and dimensions of parts of refractive surfaces;

Fig. 6 explains the underlying optical principle of my refractor, leading to perception of depth by a viewer by virtue thereof; and Figs. 7, 8, 8a and 9 depict pictures presenting systems or devices, embodying this invention.

Like numerals designate similar or corresponding parts throughout the views.

Referring to Fig. 1, the body 10 of the refractor is a sheet or plate of transparent material, such as cellulose acetate, acrylic plastics or plain glass, moulded to provide on one of the surfaces thereof series of plane strip areas 11 parallel to the back surface and curved strip areas 12, points thereon at varying distances from the back surface continuing without angular kinks or sharp bends. Needless to add, the surfaces of the refractor should be smoothly polished. The refractor is suitably mounted on a frame 13, if it is thin, to be kept flat and steady to avoid undue distortion of refracted images.

In Figs. 2 and 3, the slopes of depressions are also curved as in Fig. 1. The view in Fig. 2 shows a refractor with curved bosses 12' and flat depressions 11', while in Fig. 3, a refractor has curved bosses 12'' and depressions 12''' interposed by plane strip areas 11''.

The views herein shown are fundamental examples wherein the back surfaces are plane. While these are considered to be the best and most effective embodiments of the invention, the refractors are susceptible to bending or warping to some extent with practically no effect on their function, as the plane areas retain substantially even thickness and the curved areas varying thickness which cause the refraction of light the invention relies on for its performance.

The presence of angular kinks or sharp bends on a refractive surface may be a cause of streaks in images by skipping, doubling-up or otherwise distorting parts of refracted images. It is therefore essential for perception of clear steady images to have plane and curved areas smoothly continuous end to end, exclusive of gaps, if any, for construction requirement and/or provision of sound passages.

Although in all of the preceding views, the depressions and bossings are shown prominently for the sake of illustration, it will be later made apparent that these are rather exaggerated in comparison with the widths of the plane and curved areas.

In Figs. 4 and 5, numerals 14 and 15 respectively designate a picture and refractor in each view. The left hand surface 15' of each refractor is provided with plane and curved areas, though not shown.

A point 16 on the picture will be visible to an eye at a point 17 (Fig. 4) or 17' (Fig. 5) practically without refraction through a point 18 on a plane area of the refractive surface 15', assuming that the refractor body is very thin and the plane area is parallel to the back surface. A straight line 19—20' is drawn in parallel to line 17—18' at a distance in Fig. 4, and a line 19'—20' in parallel to line 17'—18' at the same distance in Fig. 5. If an eye at point 19 (Fig. 4) or 19' (Fig. 5) perceives the point 16 by virtue of refractions at the points 20 (on a curved area) and 20', a plane 21 (Fig. 4) or 21' (Fig. 5) tangent to the curvature at the point 20 must be at an angle with the plane of the refractor. This angle will be called the deviation angle of the curvature at the point 20, as the curvature at the point angularly deviates this much from the plane of the refractor.

Defining a deviation angle, the acute angle which a plane tangent to a curved surface of a refractor makes with the plane of the refractor is herein called the deviation angle of the curved surface at the point of tangential contact.

If the eyes at the points 17 and 19 (Fig. 4) or 17' and 19' (Fig. 5) are of one person, the distance therebetween is equal to the interpupillary distance U or about two and a half inches, and the parallel visual lines 17—18' and 19—20' (Fig. 4) or 17'—18' and 19'—20' (Fig. 5) impress or tend to impress the ocular sensory organs of the person as if the point 16 is at a point a great distance away. The deviation angle at the point 20 in such case will be called the critical deviation angle for the reason subsequently described.

If the deviation angle at the point 20 is greater than such critical deviation angle, the visual lines from the eyes will be divergent. To effect an intersection of visual lines these should necessarily be convergent, and hence the deviation angle at point 20 in each particular instance is the critical deviation angle and also the maximum deviation angle useful for the present purpose.

To find the above critical maximum deviation angle, draw a perpendicular line 16—22 to the refractive surface in each of Figs. 4 and 5. Let W represent the obliquity angle of viewing or incident angle at the point 18 which is equal to angle 18—16—22 and X, the perpendicular distance between the refractor and picture surfaces as represented by 16—22. Then we have $$\text{length } 22-18 = X \tan W$$

and $$\text{length } 18-20 = U \sec W$$

and hence, denoting angle 22—16—20 by Y, $$\tan Y = \frac{X \tan W \pm U \sec W}{X}$$

in which the plus signs are to be used in the cases of Fig. 4 and the minus signs in the cases of Fig. 5.

Denoting the refractive index of the refractor by T, and the refraction angle at the point 18 by W', $$\sin W = T \sin W'$$

and since the rays refracted at the points 18 and 20 should be parallel to each other, representing the critical deviation angle by V, $$\sin (Y \pm V) = T \sin (W' \pm V)$$

The formulae for determining the values of Y and W' having been given, the value of the critical deviation angle V can be easily derived from the above equation thus:

$$\sin Y \cos V \pm \cos Y \sin V = T \sin W' \cos V \pm T \cos W' \sin V$$

hence $$\sin Y \pm \cos Y \tan V = T \sin W' \pm T \cos W' \tan V$$

and therefore $$\tan V = \frac{\sin Y - T \sin W'}{\pm T \cos W' \mp \cos Y} = \pm \frac{\sin Y - \sin W}{\sqrt{T^2 - \sin^2 W} - \cos Y}$$

For examples, the obliquity angle W of viewing being given as 30 degrees and the refractive index as 1.5, the critical deviation angles for separation distances one, five and ten feet between a refractor and picture will be respectively as follows:

Cases of Fig. 4: 11°45'; 3°04' and 1°36'
Cases of Fig. 5: 19°46'; 3°29' and 1°41'

With the obliquity angle of viewing at zero for frontal viewing, the corresponding values of the critical deviation angles will be in both cases 22°09'; 4°44' and 2°24' which may be obtained from the following simplified formula derived from the preceding formulae:

$$\tan V = \pm \frac{U}{T\sqrt{X^2 + U^2} - X}$$

While it is desirable to bring up the maximum deviation angle of curvature of each curved area as closely to the calculated maximum effective angle as allowable for the best performance, the former should not exceed the latter or there will be sectional double images or streaks. For these reasons, the lowest figure which is that calculated at the required maximum obliquity angle in each case should be used. However, in order to augment three dimensional effect a higher figure than the above may be employed with narrow curved areas, even to an extent at which streaks of images may appear.

The separation distance between a refractor and picture being given, the value of the maximum deviation angle useful for the present purpose, is a mathematical function of the obliquity angle of viewing. However, in determining the maximum deviation angle of curvature of a curved area, the lowest value calculated therefor at the maximum obliquity angle desired may be used without seriously impairing the effectiveness of the refractor, particularly when the given separation distance is large.

In Fig. 6, numerals 15' and 14' represent the indented surface of a refractor and the picture plane of a picture carrier respectively.

Rays from a point 23 on the picture plane are perceived by the right eye 24 of a spectator through a point 25 on one of the plane areas of the indented surface and by the left eye 26 through another point 27. The extensions of visual lines 24—25 and 26—27 meet at a point slightly in front of the point 23, but to avoid confusion it will be assumed that the refractor body is very thin and hence the meeting point is on the point 23. Rays from the point 23 incident on some point 28 of a curved area, at which the deviation angle is just appropriate for the refraction, are refracted toward the right eye 24. The visual line 24—28 being extended intersects with an extension of visual line 26—27—23 at a point 29 behind the picture plane. Meanwhile, other rays from the point 23 may be refracted at a point 30 on another curved area toward the left eye 26. Visual line 26—30 will cross visual line 24—23 at a point 31 also behind the picture plane when both are extended.

As it will be readily seen the remoteness of intersections of visual lines behind the picture plane is dependent upon the distance between two refracting points, such as points 27 and 28 or 25 and 30 as well as upon the deviation angles at these points, and when the distance is equal to $U \sec W$, the remoteness is infinitely great. Figs. 4 and 5 graphically show such instances.

Applying to each point of the picture plane individually for given positions of eyes, it will be found that similar plural intersections of visual lines some at remote points far behind the picture plane may take place for the most part of the picture plane, if the widths of the plane and curved areas are suitably chosen. Such plural intersections of visual lines for greater part of the picture plane, and greater probability of such intersections for each small part of the picture plane as a whole, give rise to more effective performance of the device. For this reason, the essentiality of choosing suitable widths of the plane and curved areas or parts of even thickness and varying thickness can not be overemphasized in designing a refractor for the present purpose.

If the widths of plane strip areas or parts of even thickness are greater than $U \sec W$, there will be some parts of the picture plane for which the above described intersections of visual lines for given positions of eyes may be lacking, and with greater discrepancy therebetween less effective the refractor will be. On the other hand, if the pitch of stripes of plane and curved areas is smaller than $\frac{1}{2} U \sec W$, there will be more than two curved areas within the range of the interpupillary distance, adding extra intersections of visual lines for each small part of a picture, provided the separation distance between the refractor and picture is sufficiently large. The concerted effect of such extra intersections of visual lines will be a cause of hazy or blurring effect in images, as the number thereof increases. Hence, the presence of too many curved areas within the range of the mean interpupillary distance is not conducive to transmission of clear images of pictures, but the presence of up to two extra curved areas, which may cause extra intersections of visual lines, seems to be tolerable.

Thus the prominence of depth manifestation and clarity of images largely depend upon the widths of the plane and curved strip areas and the maximum deviation angles of curvatures of the curved areas, all of which are confined within comparatively narrow scopes.

While the maximum deviation angle useful for the purpose can be quite definitely determined by accepting the figure calculated for the maximum obliquity angle of viewing as described, the most effective pitch of stripes of plane and curved areas is not only variable with obliquity angle of viewing in proportion to $\sec W$, but also differs with different contour of curved surfaces. Providing that the separation distance between a refractor and picture is sufficiently large, the best pitch value may be found around two and a half inches but never above five inches which are respectively about once and twice the interpupillary distance. A much smaller pitch than the interpupillary distance or 2.5 inches may be advantageously used, when the desired separation distance between a refractor and picture is small.

The curvature of a curved area may be circular, elliptic or otherwise. Assuming it to be circular, the angle between a plane surface and the cord of a curvature to which the former is tangentially joined will be found to be one half of the maximum deviation angle of the curvature. When the curvature is not circular, the ratio of these angles is more or less than that given above. Hence the cord angularly deviates from the plane surface by $\frac{1}{2} V$. The frontal width of a curved area being denoted by Z, the depth of the depression will be $$\frac{Z}{2}\tan\frac{V}{2}$$

In Fig. 7, a motion picture projection system in a simplified form is illustrated. It comprises a picture screen or carrier 14 of translucent or light pervious material, such as a heavily ground sheet of cellulose acetate or a heavy silk sheet or the like. A picture projector 32 is disposed behind the carrier at a suitable distance for projecting pictures thereon. In front of the picture carrier a refractor 15, embodying this invention, is located at a predetermined distance therefrom to refract rays carrying images of pictures on the carrier toward spectators seated for an example at positions 33 and 34. The images of pictures will appear to the spectators with depth, different parts of the pictures being perceived in appropriate relative positions mostly on the picture plane and therebehind. However, the above statement does not necessarily imply that some part of the pictures will appear invariably on the picture plane, even though the intersections of visual lines take place thereon.

As depicted in Figs. 8 and 8a, a picture carrier 14' may be an usual opaque screen when desired, disposing a projector 32 on the same side with spectators with respect to the picture carrier so as to project pictures over or through a refractor 15. When a large separation distance between the refractor and picture carrier is not much drawback, the system shown in Fig. 8a may be used with a refractor having curved areas with small maximum deviation angles of curvatures on its indented surface. When it is desired to apply this invention directly to an existing projection layout, a refractor may be incorporated in the layout placing it in front of the picture screen as shown in Fig. 8. However, in this latter case, pictures on the screen are subjected more or less to the dispersive and/or condensive effect of the curved areas on the refractor.

In Fig. 9, a device for displaying or presenting photographs or prints thereof is shown. A picture on a picture carrier 14" is illuminated through my refractor 15' or from the back, for an instance, by providing a lamp 35. Since the refractor is transparent with no part hindering illumination, this invention may also be applied to a picture frame. It goes without saying that the picture carrier may be either opaque, translucent or transparent depending upon how the picture is to be illuminated. When the refractor is suitably designed with respect to the separation distance between itself and the picture carrier, persons in front of the refractor will perceive the picture in three dimensional appearance.

I have herein advanced the formulae for determining the maximum deviation angle useful for the present purpose for each given separation distance between a refractor and picture, setting the upper limit of deviation angles of refractive curvatures. To obtain full prominence of depth effect, theoretically the curvatures of the curved areas should have at some points thereon such useful maximum deviation angles for a given separation distance between the refractor and picture carrier, or inversely the separation distance should be so adjusted as to make the maximum deviation angles of the curvatures equal to or slightly smaller than the limiting or critical maximum deviation angle. However, I may prefer to have the curvatures of the curved areas with much smaller maximum deviation angles than the critical deviation angle to minimize the distortive effect of the curved areas and hence to secure the clarity of images perceived therethrough.

From the foregoing description taken in connection with the accompanying drawing, the construction and arrangement of parts and method of operation will be readily apparent to those skilled in the art to which this invention appertains.

However, in concluding this specification it may not be superfluous to restate the essential points of this invention in order to more clearly distinguish it from indented refractive screens whose sole purpose is to distort or blur images of objects or from finely lenticulated or parallel grooved screens.

To present clear images of pictures, dominantly perceptible intersections of visual lines must take place and hence parts of even thickness should be provided on a refractor. For the present purpose, auxiliary intersections of visual lines which are less impressive to the eyes than those above mentioned must also take place, thereby avoiding appearance of double images. Curved refractive surfaces or curved parts of varying thickness are capable of providing such auxiliary intersections of visual lines which are less impressive. Therefore, none of refractive screens lacking suitable combination of parts of even and varying thicknesses are operative as an instrument for the present purpose.

For constructing a refractor capable of producing the best or even tolerably good three dimensional effect, the maximum deviation angles of curvatures of the curved areas should have certain determinate value within a comparatively narrow scope, and the widths of the plane and curved strip areas on the refractive surface should be of dimensions limited in relation to the interpupillary distance, as herein set forth. Otherwise, the result will be insufficient manifestation of depth in a picture or conspicuously distorted or blurred images thereof, and a halfway operative refractor has no practical value.

While I have herein described what I now consider to be the best embodiments of my invention, I may as matters of privilege make modifications, when desired, as to fall within the scope of the invention as claimed.

Having thus described my invention, what I claim as new is:

1. A refractor of transparent material, having refractive surfaces sufficiently smooth for presenting pictures therethrough substantially without blurring and comprising strip parts of varying thickness with curved surfaces, interposed by parts of substantially even thickness; the widths of said parts being so chosen that not more than four of said parts of varying thickness can be fully embraced within the range of the mean interpupillary distance, each of said parts of even thickness having a width not larger than the mean interpupillary distance.

2. A plate of transparent material, which has refractive surfaces sufficiently smooth for transmitting images of pictures substantially without blurring and comprises stripes of parts having curved refractive surfaces and parts having parallel refractive surfaces; the widths of said stripes being so chosen that more than four of said parts with curved surfaces can not be fully embraced within the range of the mean interpupillary distance or about two and a half inches but each stripe of said parts has a width not exceeding the mean interpupillary distance.

3. A refractor of transparent material, having refractive surfaces sufficiently smooth for transmitting substantially continuous images of pictures, one of which is substantially plane and the other of which comprises stripes of curved areas interposed by substantially plane areas, smoothly continuing from end to end; the widths of said areas being so chosen that more than four of said curved areas can not be embraced within the range of the mean interpupillary distance or about two and a half inches, the individual width of each area being not exceeding the mean interpupillary distance.

4. A refractor of transparent material, having refractive surfaces sufficiently smooth for transmitting continuous images of pictures and comprising stripes of curved parts of varying thickness and parts of substantially even thickness; the surfaces of said curved parts consisting of convex and concave areas and the pitches of said stripes having dimensions within the limit between one and five inches.

5. A sheet of transparent material, which has refractive surfaces sufficiently smooth for presenting pictures therethrough substantially without blurring and comprises alternate stripes of parts of varying thickness and parts of substantially even thickness, the thickness being measured in direction perpendicular to the body of the sheet; the surfaces of said parts of varying thickness consisting of convex and concave areas and the pitches of said stripes having dimensions greater than one inch but smaller than five inches.

6. A refractor of transparent material, having refractive surfaces sufficiently smooth for transmitting continuous images of pictures therethrough and comprising strips of curved parts interposed by a part of even thickness; the width of said part of even thickness and the combined width of said curved parts each having a dimension between one half inch and two and a half inches.

7. In a system for presenting pictures, a picture carrier, and a refractor of transparent material disposed at a distance therefrom and provided with curved parts of varying thickness interposed by parts of substantially even thickness, the widths of said parts being so chosen that more than four of said curved parts can not be embraced within the dimension of two and a half inches, each of said parts of even thickness having a width not larger than two and a half inches.

8. In a picture presenting system, a picture carrier, and a screen of transparent material disposed at a distance therefrom and provided with refractive surfaces sufficiently smooth for transmitting images of pictures on said carrier, having curved and substantially plane areas in alternate stripes; the pitches of said stripes having dimensions within the limit between one and five inches.

9. In a picture presenting system, a picture carrier, and a refractor of transparent material which is disposed at a distance from said carrier and comprises strip parts of varying thickness interposed by parts of substantially even thickness, the former having curved surfaces, the widths of said parts being sufficiently large and the refractive surfaces of the refractor being sufficiently smooth for presenting pictures on said carrier, and the deviation angles of said curved surfaces varying below an acute angle the tangent of which can be expressed by $$\frac{U}{T\sqrt{X^2+U^2}-X}$$

in which X represents said distance; U, the mean interpupillary distance and T, the refractive index of said material.

10. In a picture presenting system, a picture carrier, and a sheet of transparent material disposed at a distance therefrom and provided with a refractive surface which comprises curved areas interposed by substantially plane areas, the widths of said areas being sufficiently large and the maximum deviation angle of each of said curved areas being smaller than an acute angle the tangent of which is equal to $$\frac{U}{T\sqrt{X^2+U^2}-X}$$

where X represents said distance; U, the mean interpupillary distance and T, the refractive index of said transparent material.

NAWOKICH TANAKA.